United States Patent [19]

Webster

[11] Patent Number: 5,031,451
[45] Date of Patent: Jul. 16, 1991

[54] FLUID LEVEL MONITOR

[75] Inventor: John R. Webster, Derby, England

[73] Assignee: Rolls-Royce plc, London, England

[21] Appl. No.: 459,278

[22] Filed: Dec. 29, 1989

[30] Foreign Application Priority Data

Feb. 16, 1989 [GB] United Kingdom ............... 8903532

[51] Int. Cl.⁵ ............................................. G01F 23/28
[52] U.S. Cl. .................................... 73/290 V; 340/621
[58] Field of Search ....................... 73/290 V; 340/621

[56] References Cited

U.S. PATENT DOCUMENTS

| Re. 29,435 | 10/1977 | Bergdahl | 73/290 V |
| 2,990,543 | 6/1961 | Rod | 73/290 V X |
| 4,008,613 | 2/1977 | Myers | 73/290 V |
| 4,213,337 | 7/1980 | Langdon | 73/290 V |

FOREIGN PATENT DOCUMENTS

| 55-76918 | 6/1980 | Japan | 73/290 V |
| 1595194 | 9/1977 | United Kingdom . |
| 2078955 | 6/1980 | United Kingdom . |
| 2206965 | 6/1988 | United Kingdom . |

Primary Examiner—Daniel M. Yasich
Attorney, Agent, or Firm—Cushman, Darby & Cushman

[57] ABSTRACT

A fluid level monitor for monitoring the level of fluid in a vessel comprises an inverted U-shaped propagation member which allows the propagation of stress waves therethrough. A first limb of the propagation member is immersed in the fluid in the vessel and a second limb is positioned outside the vessel. A transmitter transducer and a receiver transducer are acoustically coupled to the second limb of the propagation member. The transducer transmit stress wave pulses into the propagation member, the stress wave pulses produce a diffuse stress wave field in the propagation member which is damped by any fluid contacting the first limb of the propagation member. The transducer detects the stress waves propagating in the propagation member and produces an electrical signal corresponding to the level of the diffuse stress wave field. An analyzer measures the decay rate of the diffuse stress wave field which is indicative of the level of fluid in the vessel contacting the propagation member.

8 Claims, 4 Drawing Sheets

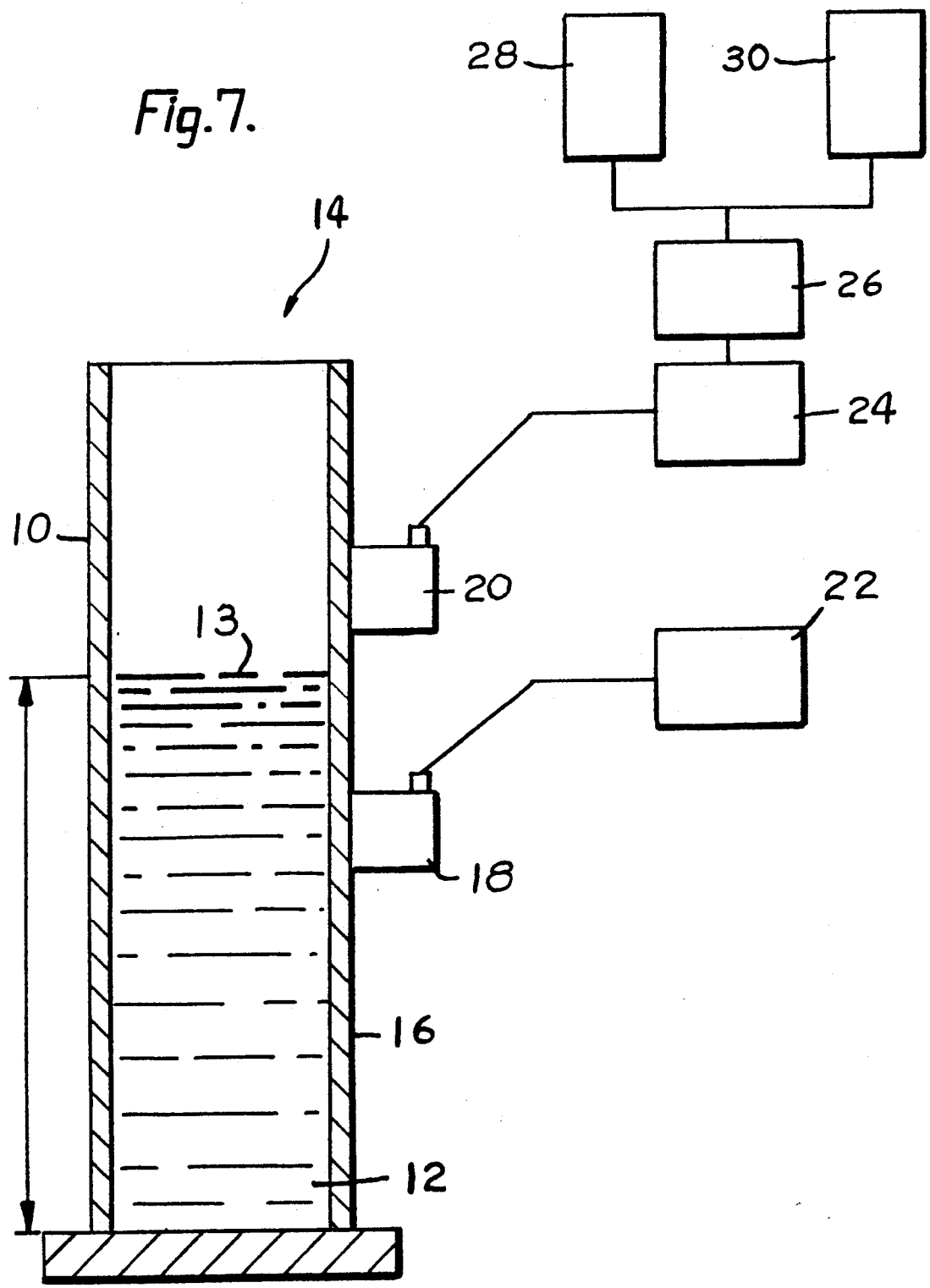

FLUID LEVEL MONITOR

BACKGROUND OF THE INVENTION

1. Field of the Invention

The present invention relates to fluid level monitors for monitoring the level of fluid in a vessel.

2. Background Information

A known method of monitoring fluid levels in a vessel is to perform a time of flight measurement. A transducer emits a pulse of ultrasound from either above or below a fluid level and the reflection of the ultrasound from the fluid surface is detected by the transducer and the time taken for the ultrasound to travel from the transducer to the fluid surface and back is measured. Using the knowledge of the velocity of the ultrasound in the fluid, or acoustic conductor, it is then possible to calculate the fluid level.

A further known method of monitoring fluid levels in a vessel is to position a pair of transducers, one vertically above the other on the vessel wall. One of the transducers emits a pulse of ultrasound from either above or below the fluid level, and the other transducer detects the ultrasound travelling vertically in the vessel wall. The ultrasound propagating in the vessel wall is damped by any fluid contacting the vessel wall. The amplitude of the detected ultrasound is a measure of the level of the fluid in the vessel. This method, however, is not completely satisfactory because the amplitude of the detected ultrasound is dependent also upon the transducer sensitivity as well as the fluid level. This method would require careful calibration to compensate for the transducer sensitivities.

The present invention seeks to provide a novel apparatus for monitoring the level of fluid in a vessel.

Accordingly, the present invention provides a fluid level monitor for monitoring the level of fluid in a vessel comprising a propagation member which allows the propagation of stress waves therethrough, at least one acoustic emission transducer acoustically coupled to the propagation member, the at least one acoustic emission transducer being arranged to transmit one or more stress wave pulses into the propagation member, the stress wave pulse propagating in the propagation member for a period of time to produce a diffuse stress wave field in the propagation member, the diffuse stress wave field being damped by any fluid in contact with the propagation member, the at least one acoustic emission transducer detecting the stress wave propagating in the propagation member and producing an electrical signal corresponding to the level of diffuse wave field, analyzer means to analyse the electrical signal to measure the damping of the diffuse stress wave field, the amount of damping of the diffuse stress wave field being indicative of the level of fluid in the vessel contacting the propagation member.

The propagation member may be formed integral with the wall of the vessel.

At least a first portion of the propagation member may extend into and be positioned within the vessel.

A second portion of the propagation member may be positioned outside of the vessel, the at least one transducer is positioned on the second portion of the propagation member.

A first transducer may be arranged to transmit stress wave pulses into the propagation member, a second transducer is arranged to detect the stress waves propagating in the propagation member.

The analyzer means may measure the damping of the diffuse stress wave field by measuring the decay rate of the diffuse stress wave field.

The decay rate may be measured using the slope of the envelope of the diffuse stress wave field.

The decay rate may be measured for a transient stress wave pulse.

The decay rate may be measured for repeated stress wave pulses.

BRIEF DESCRIPTION OF THE DRAWINGS

The present invention will be more fully described by way of example with reference to the accompanying drawings in which:

FIG. 7 is a longitudinal cross-sectional view of a vessel having a fluid level monitor according to the present invention where the propagation member is formed integral with the wall of the vessel.

DETAILED DESCRIPTION OF THE PREFERRED EMBODIMENTS

Figure 1:
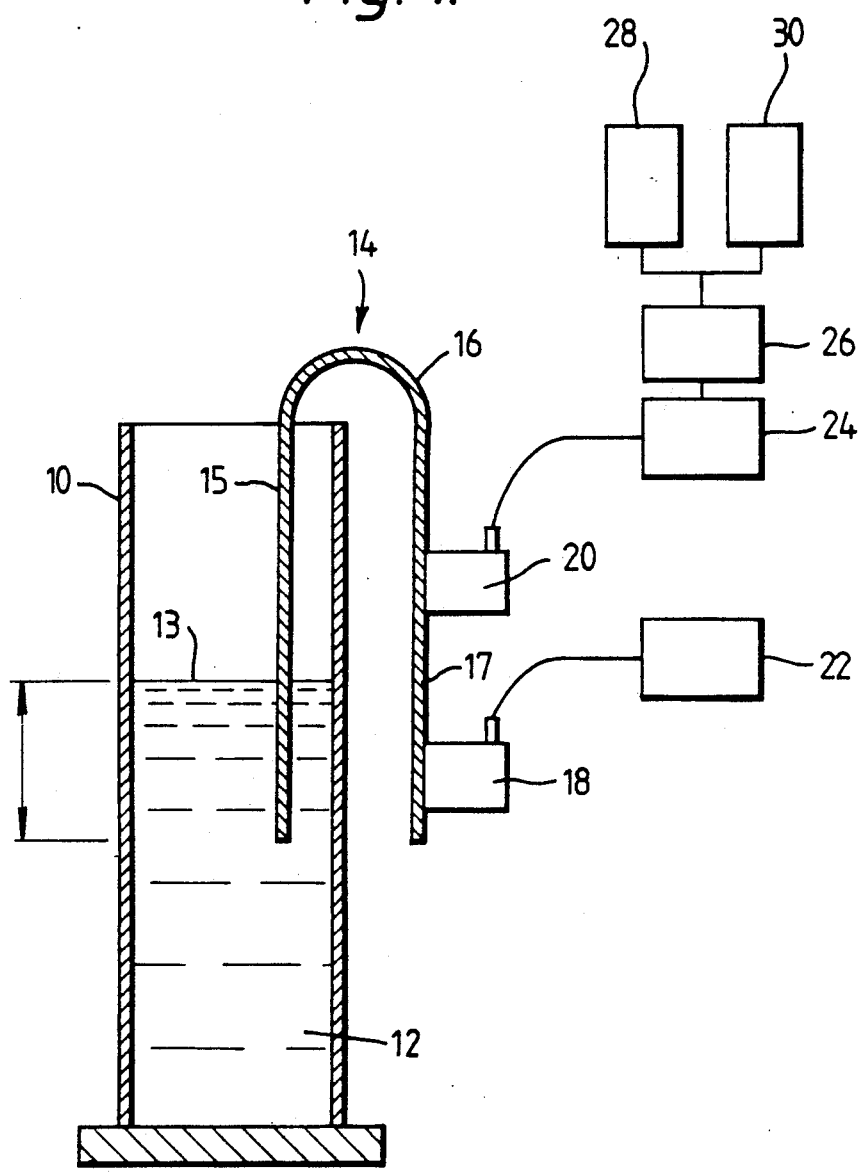
FIG. 1 is longitudinal cross-sectional view of a vessel having a fluid level monitor according to the present invention.

A vessel 10 with a fluid level monitor 14 is shown in FIG. 1. The vessel 10 contains a fluid 12, and the fluid 12 has a fluid level 13. The fluid level monitor 14 comprises a propagation member 16 which allows the propagation of stress waves, elastic waves, ultrasound or acoustic emission therethrough. The propagation member 16 is formed from any suitable material with this property. The propagation member 16 as shown is of inverted U-shape and a first limb 15, or portion, of the propagation member 16 extends into and is positioned in the vessel 10 and a second limb 17, or portion, of the propagation member 16 is positioned outside the vessel 10. A first transducer 18 and a second transducer 20 are acoustically coupled to the second limb 17 of the propagation member 16. The first transducer 18 is a transmitter and is electrically connected to a pulse generator 22. The second transducer 20 is a receiver and is electrically connected in series to an amplifier 24 and an analyzer 26. The analyzer 26 is electrically connected to a display 28, and a recorder 30.

In operation the pulse generator 22 sends an electrical pulse, or pulses, to the first transducer 18, which transmits stress waves into the propagation member 16. The stress waves propagate in the propagation member 16 and reverberate around the propagation member 16 for a considerable time period to produce a diffuse stress wave field. During this reverberation, the stress waves are reflected around the propagation member many times, for example there may be several thousand reflections. The diffuse stress wave field is damped as the stress waves propagate through the propagation member 16, by the propagation member itself but more significantly by any fluid contacting the propagation member. The amount of damping of the diffuse stress wave field is dependent on the area of the propagation member contacted with fluid.

The second transducer 20 detects the level of the diffuse stress wave field in the propagation member, and converts the stress waves into an electrical signal. The electrical signal is amplified by the amplifier 24 and is then analyzed by the analyser 26 to measure the damping of the diffuse stress wave field, the amount of damping of the stress wave field is indicative of the area of the propagation member 16 contacted by the fluid, which is dependent on the level of fluid in the vessel contacting the propagation member 16. The analyzer is arranged to send an electrical output signal to a display 28 and a recorder 30. The display 28 for example may be a Visual Display Unit or a gauge.

Figure 2:
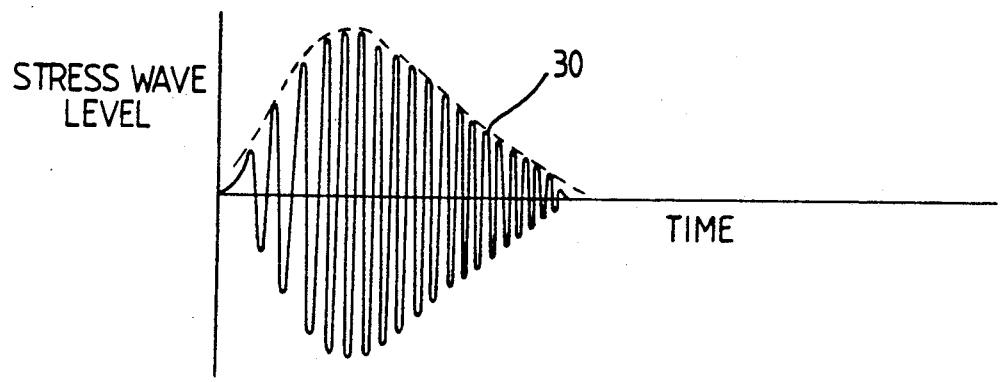
FIG. 2 is a graph of stress wave level against time for a typical transient stress wave pulse.
Figure 3:
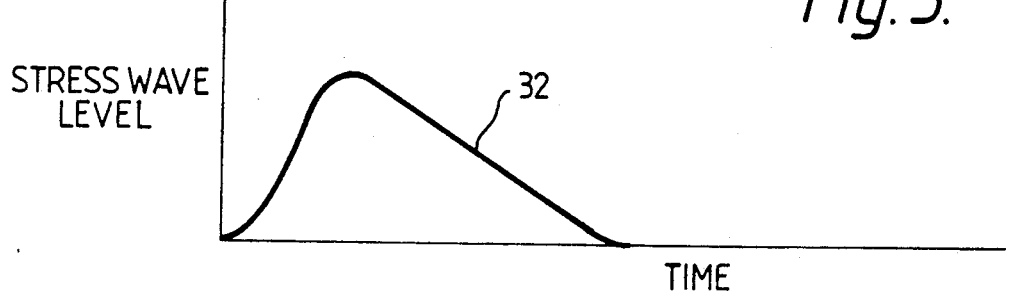
FIG. 3 is a graph of stress wave level against time showing the envelope of the typical stress wave pulse.

Preferably the transducer 18 emits a single transient stress wave pulse which reverberates in the propagation member 16 and is detected by the transducer 20. The detected reverberating stress wave level 30 from a single transient stress wave pulse is shown in FIG. 2, and FIG. 3 indicates an envelope 32 which the analyzer 26 applies to the reverberating stress wave level 30 about the peaks and troughs of the reverberations.

Figure 4:
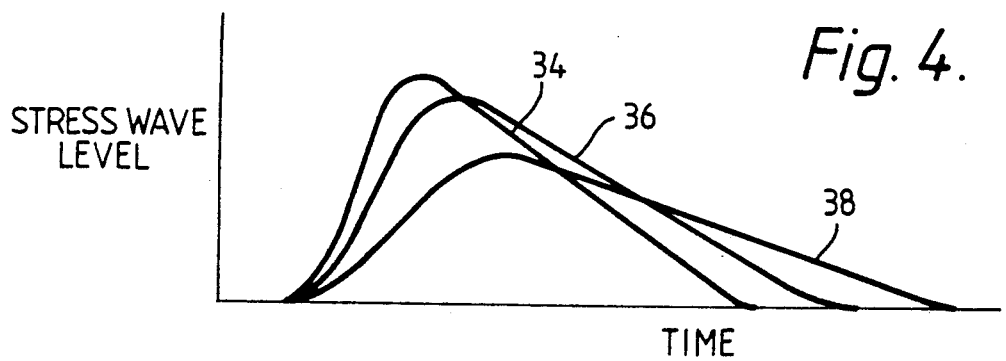
FIG. 4 is a graph of stress wave level against time showing three different envelopes of typical stress wave pulses.
Figure 5:
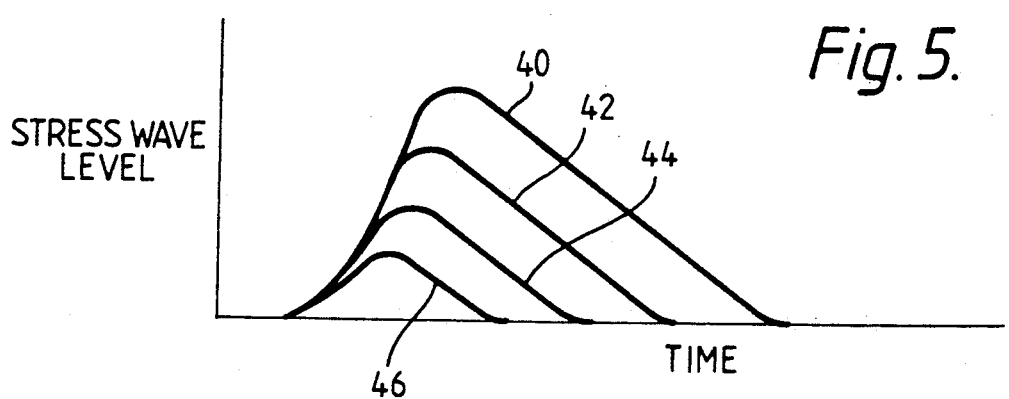
FIG. 5 is a graph of stress wave level against time showing different envelopes of a single typical stress wave pulse for different transducer sensitivities.

Preferably the analyzer 26 measures the decay rate of the diffuse stress wave field ie. the decay rate of the reverberating stress wave level from the single transient stress wave pulse. FIG. 4 shows the envelopes 34, 36 and 38 detected by the transducer 20 from a single transient stress wave pulse for three different fluid levels in the vessel, it can be clearly seen that the envelope 36 has a smaller decay rate ie. slope than envelope 34 and that the envelope 38 has the smallest decay rate. Envelope 34 corresponds to the greatest level of fluid and envelope 38 corresponds to the smallest level of fluid. FIG. 5 shows envelopes 40, 42, 44 and 46 detected by transducers 20 with varying sensitivities but for the same level of fluid. It can be clearly seen that although the maximum stress wave level decreases with sensitivity the decay rate of the reverberate stress wave level remains constant.

The measurement of the decay rate of the diffuse stress wave field is a more accurate and repeatable technique for measuring the fluid level, and is unaffected by transducer sensitivity or changes of transducer sensitivity.

Figure 6:
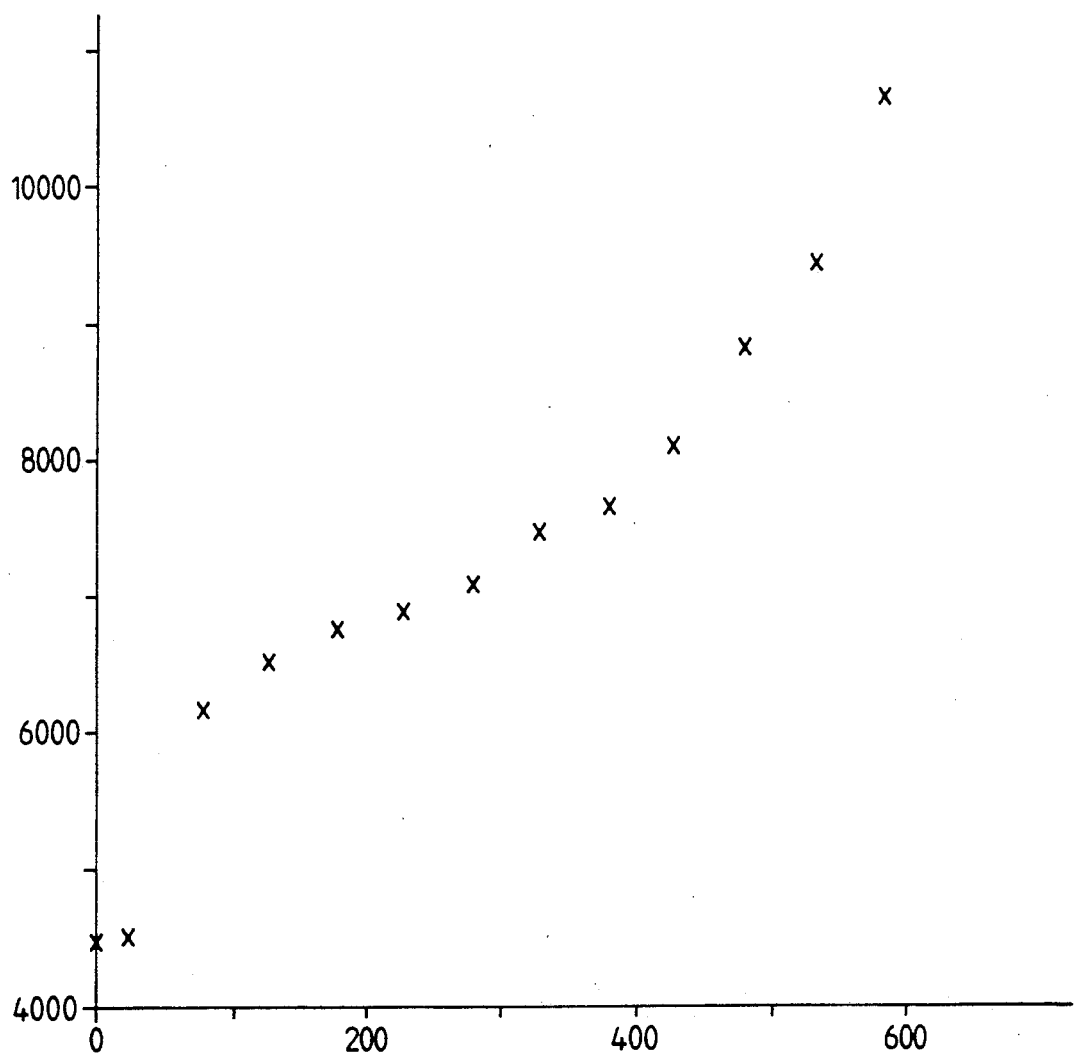
FIG. 6 is a graph of diffuse stress wave field level decay rate against fluid level.

FIG. 6 shows a graph of the decay rate of the diffuse stress wave field level against fluid level, and this shows a steady increase of decay rate with fluid level over the whole range. A monatonically increasing linear relationship appears to exist over the whole range.

It may be possible to compensate for the non-linearities by appropriate shaping of the propagation member, or by using suitable corrections in the analyzer.

It may be possible to use more than a single transient stress wave pulse for example a repeated stress wave pulse emission.

In some applications it may be necessary to surround the propagation member with a sleeve which does not allow stress waves to propagate therethrough so that the propagation member is isolated from the fluid.

The second portion of the propagation member may form a waveguide such that the transducers are located at a position remote from the vessel, particularly if the vessel is in hostile environments, to protect the transducers.

Although in the embodiment a pair of transducers have been used, it is possible to use a single transducer which acts as a transmitter/receiver. However such an arrangement requires more complex electronics.

In the example of FIG. 6 which gives actual measurements of stress wave level decay rate against fluid level, stress waves with a frequency content in the region of 150kHz were generated and detected using resonant piezo-electric transducers.

The propagation member may form a portion of the vessel wall, however it is preferred that the propagation member is separate from the vessel because the propagation member would be isolated from external noise sources, and it would allow the propagation member to be shaped as discussed above.

FIG. 7 is a longitudinal cross-sectional view of a vessel having a fluid level monitor according to the present invention where the propagation member is formed integral with the wall of the vessel.

I claim:

1. A fluid level monitor for monitoring the level of a fluid, comprising:
   a vessel which contains the fluid, the vessel comprising a propagation member which contacts the fluid, the propagation member allowing the propagation of stress waves therethrough;
   an acoustic emission transducer means for transmitting at least one stress wave pulse into the propagation member, the acoustic emission transducer means being acoustically coupled to the propagation member, the at least one stress wave pulse propagating in the propagation member for a period of time to produce a diffuse stress wave field in the propagation member, the diffuse stress wave field being damped by the fluid in contact with the propagation member so that after each of said at least one stress wave pulse, the diffuse stress wave in the propagation member dies out with a decay rate, the acoustic emission transducer means also detecting the stress wave propagating in the propagation member and producing an electrical signal corresponding to the level of the diffuse stress wave field; and
   analyzer means for analyzing the electrical signal to measure the decay rate of the diffuse stress wave field, the decay rate of the diffuse stress wave field being dependent upon the area of contact between the fluid and the propagation member and thus being indicative of the level of fluid in the vessel contacting the propagation member.

2. A fluid level monitor as claimed in claim 1 in which the propagation member is formed integral with the wall of the vessel.

3. A fluid level monitor as claimed in claim 1 in which at least a first portion of the propagation member extends into and is positioned within the vessel.

4. A fluid level monitor as claimed in claim 3 in which a second portion of the propagation member is positioned outside of the vessel, said acoustic emission transducer means being positioned on the second portion of the propagation member.

5. A fluid level monitor as claimed in claim 1 in which said acoustic emission transducer means comprises a first transducer and a second transducer, said first transducer being arranged to transmit said at least one stress wave pulse into the propagation member, said second transducer being arranged to detect said at least one stress wave pulse propagating in the propagation member.

6. A fluid level monitor as claimed in claim 1 in which the decay rate is measured using the slope of the envelope of the diffuse stress wave field.

7. A fluid level monitor as claimed in claim 1 or claim 6 in which the decay rate is measured for a transient stress wave pulse.

8. A fluid level monitor as claimed in claim 1 or claim 6 in which the decay rate is measured for repeated stress wave pulses.

* * * * *